United States Patent [19]
Hsieh

[11] 3,716,495
[45] Feb. 13, 1973

[54] POLYMERIZATION INITIATOR COMPOSITION AND USE THEREOF

[75] Inventor: Henry L. Hsieh, Bartlesville, Okla.

[73] Assignee: Phillips Petroleum Company

[22] Filed: Sept. 2, 1970

[21] Appl. No.: 69,123

[52] U.S. Cl........252/431 L, 252/431 N, 260/94.2 M, 260/94.3, 260/94.4, 260/94.6, 260/83.7, 260/84.1, 260/84.3, 260/84.7
[51] Int. Cl............C08f 1/28, C08f 3/06, C08d 1/14
[58] Field of Search................252/431, 431 N, 431 L

[56] References Cited

UNITED STATES PATENTS

| | | | |
|---|---|---|---|
| 3,451,988 | 6/1969 | Langer | 252/431 N X |
| 3,206,519 | 9/1965 | Eberhardt | 252/431 N X |
| 3,278,508 | 10/1966 | Kahle et al. | 252/431 R X |
| 3,313,741 | 4/1967 | Uelzmann | 252/431 N X |
| 3,444,102 | 5/1969 | Ito et al. | 252/431 N X |

Primary Examiner—Patrick P. Garvin
Attorney—Young and Quigg

[57] ABSTRACT

An initiator composition, formed by mixing: (a) an organolithium compound and (b) a hydrocarbyl metal compound wherein the metal is selected from Group 2a, 2b, or 3a of the Periodic Table, is employed in the presence of a polar compound selected from ethers, thioethers, and tertiary amines in the preparation of homopolymers and copolymers of conjugated dienes and vinyl-substituted aromatic hydrocarbons.

18 Claims, No Drawings

POLYMERIZATION INITIATOR COMPOSITION AND USE THEREOF

This invention relates to initiator compositions for the preparation of improved polymers of conjugated dienes and vinyl-substituted aromatic compounds. In another aspect the invention relates to producing conjugated diene and vinyl-substituted hydrocarbon polymers of modified properties for improved processing properties. In a further aspect, the invention relates to the coupling of polymers produced with initiator compositions of the invention.

It has been discovered that organolithium compounds in admixture with hydrocarbyl metal compounds of Groups 2a, 2b, or 3a of the Periodic Table, Handbook of Chemistry and Physics, 49th Edition, p. B3, Chemical Rubber Publishing Company, give greatly improved results when utilized for polymerization purposes in the presence of certain polar compounds, specifically ethers, thio-ethers, and tertiary amines.

The initiator composition of this invention provides for more efficient utilization of organolithium compounds as polymerization initiators and produces polymers of broad molecular weight distribution and controlled molecular weight which in turn yields polymers of improved processing characteristics.

By use of the initiator compositions of this invention, the molecular weight of the polymers thereby produced can be controlled, e.g., the hydrocarbyl metal component $R_nM$ and the polar compound provide a method of reducing the molecular weight obtained when employing organolithium initiators. With certain insoluble initiator compositions, the induction period is greatly reduced or eliminated by the use of the initiator compositions of this invention. The molecular weight distribution of the polymers is broadened, especially when coupling agents are employed in the polymerization termination step. Further, in the presence of unusually large amounts of impurities, the initiator compositions of this invention provide better control of product molecular weight.

Organolithium polymerization initiators are well known in the art and any of these can be used in this invention. Preferred organolithium compounds have the formula $R(Li)_x$ wherein R is an alkyl, aryl, cycloalkyl, alkaryl, or aralkyl radical containing from one to 20 carbon atoms and wherein X is an integer of from 1 to 4, such as methyllithium; n-butyllithium; n-decyl-lithium; phenyllithium; 1-naphthyllithium; p-tolyllithium; cyclohexyllithium; 1,4-dilithiobutane; 1,2-dilithioeicosane; 1,4-dilithio-2-butene; 4,4'-dilithio-biphenyl; 1,2-dilithio-1,2-diphenylethane; 1,4-dilithiocyclohexane; 1,3-dilithio-4-ethylbenzene; 1,5,12-trilithiododecane; dilithiomethane; 1,3,5,7-tetralithiocyclododecane; tert-butyllithium; sec-butyllithium; and dilithium adducts of isoprene and butadiene wherein the adduct contains from 1 to 7 diene units per molecule; and the like.

The amount of organolithium compound employed can vary over a wide range, but will generally be from 0.25 to 100 gram millimoles per 100 grams of monomer(s) (mhm).

Suitable hydrocarbyl metals $R_nM$ wherein R has the same meaning as above and wherein M is a metal selected from Groups 2a, 2b, or 3a of the Periodic Table and n is an integer equal to the valence of M, include dimethylberyllium; dicyclopentylbarium; diphenylstrontium; di-p-tolylcalcium; dibutylmagnesium; diethylzinc; dieicosylmercury; di-n-octylcadmium; triisobutylaluminum; triphenylaluminum; trimethylaluminum; tri-n-butylgallium; tricyclopentylindium; tri(4-phenylcyclohexyl)thallium; di-n-pentylmagnesium; diethylcadmium; and the like.

The mole ratio of organolithium compounds to the hydrocarbyl metal compounds is in the range of from 0.1:1 to 10:1, preferably from 1:1 to 5:1.

The order of charging the components of the initiator composition of this invention is not critical. For example, the organolithium compound and the hydrocarbyl metal compound can be preformed in the presence of or in the absence of the polar compounds or each of the components can be added separately in any order to the polymerization system.

Polar compounds suitable for use in this invention include ethers, including cyclic or acyclic, mono- or polyethers and thioethers, and tertiary amines, having from 2 to 30, preferably from 2 to 12, carbon atoms per molecule. Examples of suitable polar compounds include dimethyl ether, diethyl ether, ethyl methyl ether, ethyl propyl ether, di-n-propyl ether, di-n-octyl ether, dibenzyl ether, diphenyl ether, anisole, tetramethylene oxide (tetrahydrofuran), 1,2-dimethyoxyethane, di-n-pentadecyl ether, dioxane, paraldehyde, dimethyl sulfide, diethyl sulfide, di-n-propylsulfide, di-n-butyl sulfide, methyl ethyl sulfide, dimethylethylamine, tri-n-propylamine, tri-n-butylamine, trimethylamine, triethylamine, tri-n-decylamine, N,N-dimethylaniline, pyridine, quinoline, N-ethylpiperidine, N-methyl-N-ethylaniline, N-methylmorpholine, and the like; preferably dimethyl ether, diethyl ether, tetrahydrofuran, 1,4-dioxane, diphenyl sulfide, triethylamine, and the like. Especially good results are obtained with tetrahydrofuran (THF).

The amount of polar compound employed is conveniently expressed in terms of the amount of monomers employed and is generally in the range of from 0.01 to 30 parts by weight per 100 parts of monomer.

The ratio of organolithium compound to polar compound employed can vary over a wide range to give the results desired in a process employing organolithium compound in admixture with hydrocarbyl metal compound for polymerization in the presence of polar compound. If the weight unit for the monomer is expressed in grams, the ratio of gram millimoles of organolithium compound per gram of polar compound can be determined by dividing 0.25 by 30 to determine the lower value of the suggested range, and 100 by 0.01 to determine the upper value of the suggested range, thus giving a suggested range of about $8.33 \times 10^{-3}$ up to $10^4$ gram millimoles of organolithium compound per gram of polar compound employed. Such values can be further converted to a ratio of gram millimoles of organolithium compound per gram millimole of polar compound by dividing $8.33 \times 10^{-3}$ to $10^4$ by the number of gram millimoles of the specific polar compound employed. For example, if the polar compound to be employed is tetrahydrofuran, dividing each of $8.33 \times 10^{-3}$ and $10^4$ by 13.88 gives a range of $6 \times 10^{-4}$ to $7.21 \times 10^2$ gram millimoles of organolithium compound per gram millimole of tetrahydrofuran.

The monomers which can be employed are those known to polymerize with alkali metal and organoalkali metal initiator systems. Such monomers useful with the initiator compositions of this invention include the conjugated dienes containing from 4 to 12 carbon atoms per molecule and the vinyl-substituted aromatic hydrocarbons containing from eight to 20 carbon atoms per molecule. Examples of suitable monomers include 1,3-butadiene, 1,3-pentadiene, isoprene, 1,3-dodecadiene, 1,3-octadiene, styrene, 4-ethylstyrene, 1-vinylnaphthalene, 10-n-butyl-9-vinylanthracene, and the like. Mixtures of two or more monomers can be employed, and sequential addition and polymerization of different monomers can also be used with these initiators.

The temperatures employed for the polymerization will generally be from −50° to 150° C., preferably from −10° to 75° C. The pressures employed will be at least sufficient to maintain at least a portion of the reaction mixture in a liquid phase.

It is preferred that the polymerization be carried out in the presence of a suitable diluent such as inert hydrocarbons containing from four to 10 carbon atoms per molecule, such as n-butane, cyclohexane, n-hexane, toluene, benzene, decane, and the like.

Polymerization systems employing the initiator composition of this invention can be terminated with various known terminating and/or coupling agents such as are described in U.S. Letters Pats. Nos. 3,393,182, to William J. Trepka, issued July 16, 1968, and 3,281,383, to Robert P. Zelinski and Henry L. Hsieh, issued Oct. 25, 1966. Particularly good results are obtained with the the tin halides such as stannic chloride, the silicon polyhalides such as silicon tetrachloride, or the alkylsilicon polyhalides such as methyl-silicon trichloride. Branching agents such as divinylbenzene can also be employed with the initiators of this invention. Other useful terminating agents are described in U.S. Letters Pats. Nos. 3,135,716, to Carl A. Uraneck, James N. Short and Robert P. Zelinski, issued June 2, 1964, and 3,175,997, to Henry L. Hsieh, issued Mar. 30, 1965.

The following examples demonstrate the use of the initiator compositions of this invention in achieving many of the desired effects discussed above. These examples and the reactants used therein are intended to be illustrative of this invention and not limitative.

EXAMPLE I

Butadiene was polymerized in a series of runs employing n-butyllithium and diethylzinc (DEZ) in the presence or absence of a polar compound, tetrahydrofuan (THF). The results of these runs are shown in Table I.

Polymerization Recipe

| | Parts by Weight |
|---|---|
| Butadiene | 100 |
| Cyclohexane | 780 |
| n-Butyllithium (n-BuLi) | variable |
| Diethylzinc (DEZ) | variable |
| Tetrahydrofuran (THF) | variable |
| Temperature, °F. | 158 |
| Time, hours | 2 |
| Charge order: | cyclohexane, N₂ purge, THF (where added), n-BuLi, DEZ (where added), 20 minutes at about 75° F., butadiene, adjust temperature to 158° F. |

TABLE I

| Run No. | THF phm (a) | n-BuLi mhm (b) | DEZ mhm (b) | Conversion % | I.V. (c) |
|---|---|---|---|---|---|
| 1 | — | 1.8 | 0 | 100 | 0.87 |
| 2 | — | 1.8 | 0.36 | 100 | 0.84 |
| 3 | — | 1.8 | 1.8 | 100 | 0.86 |
| 4 | — | 1.8 | 7.2 | 100 | 0.84 |
| 5 | 1.5 | 2.2 | 0 | 95 | 0.81 |
| 6 | 1.5 | 2.2 | 0.72 | 95 | 0.59 |
| 7 | 1.5 | 2.2 | 1.8 | 90 | 0.48 |
| 8 | 1.5 | 2.2 | 7.2 | 81 | 0.37 |

(a) phm = parts by weight per 100 parts by weight of monomer(s).
(b) mhm = gram millimoles per 100 grams of monomer(s).
(c) I.V. = inherent viscosity determined according to the procedure of United States 3,278,508 col. 20, notes a and b.

Each run was terminated with a 10 weight per cent solution of 2,2'-methylene-bis(4-methyl-6-tert-butylphenol) in a 50/50 by volume mixture of isopropyl alcohol and toluene with the amount added being sufficient to provide about 1 part by weight of the antioxidant per 100 parts by weight of the polymer. Each terminated polymer solution was coagulated with isopropyl alcohol and the polymers separated and dried.

The results shown in Table I show that in the presence of a polar compound, here THF, the hydrocarbyl metal compound, here DEZ, was much more effective in serving to decrease the molecular weight of the polybutadienes than in the absence of the polar compound.

EXAMPLE II

Another series of runs was carried out employing an insoluble dilithium initiator prepared by reacting lithium metal with isoprene in dimethyl ether. The solid reaction product was dispersed in an aromatic solvent, benzene, and the bulk of the dimethyl ether then stripped off. The initiator thus formed, represented by the formula $Li_2(C_5H_8)_2$, though exact structure is not known, contained about 1 mole of dimethyl ether per 4 to 5 moles of the dilithium compound. The dimethyl ether present functioned as the polar compound necessary to the invention. The recipe employed and the results obtained in this series of runs are presented below.

Polymerization Recipe

| | Parts by Weight |
|---|---|
| Butadiene | 100 |
| Cyclohexane | 780 |
| $Li_2(C_5H_8)_2$ (DiLi-I) | 1.8 mhm |
| Diethylzinc (DEZ) | variable |
| Temperature, °F. | 158 |
| Time, hours | 4 |
| Charge order: | cyclohexane, N₂ purge, DiLi-I, DEZ (where added), 1.5 hours at 75°F, butadiene, adjust to 158°F. |

The polymerization runs were terminated and the products isolated as described in Example I.

TABLE II

| Run No. | DEZ mhm | Conversion % | I.V. | Unsaturation (a) Vinyl, % | Trans, % |
| --- | --- | --- | --- | --- | --- |
| 1 | 0 | 100 | 1.09 | 9.8 | 51.2 |
| 2 | 0.90 | 100 | 0.82 | 9.8 | 53.1 |
| 3 | 1.8 | 100 | 0.70 | 9.8 | 52.9 |
| 4 | 14.4 | 100 | 0.62 | 9.4 | 53.7 |

(a) Determined according to the procedure of United States Patent 3,317,503 To Floyd E. Naylor, column 8 lines 19–44. However, the extinction coefficient for the vinyl bond was 196 rather than 209 as shown in this patent.

The results in Table II show again a reduction in inherent viscosity where an initiator composition of this invention is employed. It is also noted that the polymer microstructure is essentially unaffected by employment of the diethylzinc component in the catalyst composition.

EXAMPLE III

Other runs were conducted employing the organolithium compound of Example II as an initiator for the preparation of low molecular weight hydroxy-terminated polymers of butadiene. The results obtained and recipe employed are shown below.

Polymerization Recipe

| | Parts by Weight |
| --- | --- |
| Step 1 | |
| Butadiene | 100 |
| Cyclohexane | 780 |
| $Li_2(C_5H_8)_2$ (DiLi-I) | 20 mhm |
| Diethylzinc (DEZ) | variable |
| Temperature, °F. | 122 |
| Time, hours | 4 |
| | |
| Step 2 | |
| Ethylene oxide | 25 |
| Temperature, °F. | 122 |
| Time, hours | 2 |
| Charge order: | cyclohexane, $N_2$ purge, DiLi-I, DEZ (where added), butadiene, adjust to 122°F, time, ethylene oxide. |

The polymerization runs were terminated as in Example I and then acidified with aqueous HCl The organic phase from each run was separated and washed with water until essentially neutral, then dried to remove diluent and remaining water.

TABLE III

| Run No. | DEZ mhm | Conversion % | Viscosity Poise | Hydroxyl (a) % |
| --- | --- | --- | --- | --- |
| 1 (b) | 0 | 100 | 120 | 0.64 |
| 2 | 10 | 100 | 42 | 0.72 |
| 3 | 20 | 100 | 34 | 0.89 |

(a) Determined according to a procedure of J. S. Fitz and G. M. Schenk, Anal. Chem. 31, 1808 (1959).
(b) Due to the extremely high solution viscosity of this mixture after Step 1, 10 phm of tetrahydrofuran was added to fluidize the mixture before the ethylene oxide was added. This procedure was not necessary in Runs 2 and 3.

The results in Table III show that a more efficient initiator system is provided by this invention in that per cent hydroxyl was increased and poise viscosity decreased compared to the control Run 1 of the example.

EXAMPLE IV

Runs were conducted according to this invention employing another insoluble organolithium initiator. This initiator was prepared by reacting 1 mole of butadiene with 2 moles of sec-butyllithium in a cycloaliphatic solvent, cyclohexane. It can be represented as $Li_2(C_8H_{14})$, although its exact nature and composition is not certain. The recipe and results are given below.

Polymerization Recipe

| | Parts by weight |
| --- | --- |
| Butadiene | 75 |
| Styrene | 25 |
| Cyclohexane | 80 |
| $Li_2(C_8H_{14})$ | variable |
| Diethylzinc (DEZ) | variable |
| Tetrahydrofuran (THF) | variable |
| Temperature, °F | 158 |
| Time, hours | 3 |
| Charge order: | cyclohexane, $N_2$ purge, butadiene, styrene, THF (where added), DEZ (where added), $Li_2(C_8H_{14})$, adjust temperature to 158°F. |

The termination and polymer isolation procedures employed in these runs were the same as those of Example I.

TABLE IV

| Run No. | $Li_2(C_8H_{14})$ mhm | DEZ mhm | THF phm | Conv. % | I.V. | Induction Period min.(ca.) (a) |
| --- | --- | --- | --- | --- | --- | --- |
| 1 | 1.4 | 0 | 1.5 | 99 | 3.18 | 20 |
| 2 | 1.2 | 0 | 1.5 | 97 | 3.40 | 20 |
| 3 | 1.4 | 0.6 | 1.5 | 99 | 1.32 | 5 |
| 4 | 1.4 | 1.2 | 1.5 | 99 | 0.88 | 5 |
| 5 | 1.2 | 0.5 | 1.5 | 99 | 1.52 | 5 |
| 6 | 1.2 | 1.0 | 1.5 | 99 | 0.98 | 5 |
| 7 | 1.2 | 0.5 | 0 | 100 | 2.29 | 5 |
| 8 | 1.2 | 1.0 | 0 | 100 | 2.00 | 5 |

(a) Time, in minutes, until visible evidence of polymerization is noted.

The results in Table IV again show that increased initiator efficiency is obtained with a composition of this invention and that the induction period is greatly reduced employing said composition. It is further noted (Runs 2, 5, 6, 7, and 8) that the modification of polymer molecular weight is greatly enhanced if THF is present along with DEZ.

EXAMPLE V

A series of runs employing $SiCl_4$ as a coupling agent was conducted using an initiator composition of this invention. The recipe and results appear below.

Polymerization Recipe

| | Parts by weight |
| --- | --- |
| Step 1 | |
| Butadiene | 75 |
| Styrene | 25 |
| Cyclohexane | 780 |

| | |
|---|---|
| Tetrahydrofuran (THF) | 1.5 |
| n-Butyllithium (n-BuLi) | 1.4 mhm |
| Diethylzinc (DEZ) | variable |
| Temperature, °F | 158 |
| Time, hours | variable |
| Step 2 | |
| Silicon tetrachloride (SiCl$_4$) | variable |
| Temperature, °F | 158 |
| Time, hours | 1 |
| Charge order: | cyclohexane, N$_2$ purge, butadiene, styrene, THF, DEZ (where added), n-BuLi, adjust to 158°F, time, SiCl$_4$, time. |

These runs were terminated and the products isolated as described in Example I.

TABLE V

| Run No. | Step 1 Time Hours | DEZ mhm | SiCl$_4$ mhm | Conversion % | H.I.(a) | I.V. |
|---|---|---|---|---|---|---|
| 1 | 3 | 0 | 0 | 97 | 1.32 | 1.21 |
| 2 | 3 | 0.30 | 0 | 96 | 1.39 | 0.98 |
| 3 | 3 | 0.60 | 0 | 96 | 1.59 | 0.85 |
| 4 | 1 | 0.30 | 0.08 | ca. 96 | 1.63 | 1.49 |
| 5 | 1 | 0.30 | 0.15 | ca. 96 | 1.62 | 1.21 |
| 6 | 1 | 0.30 | 0.30 | ca. 96 | 1.48 | 1.25 |
| 7 | 1 | 0.60 | 0.08 | ca. 96 | — | 0.98 |
| 8 | 1 | 0.60 | 0.15 | ca. 96 | — | 1.07 |
| 9 | 1 | 0.60 | 0.30 | ca. 96 | — | 1.00 |

(a) Heterogeneity Index, the ratio of the weight average molecular weight ($M_w$) to the number average molecular weight ($M_n$) as determined by gel permeation chromatography.

The results in Table V show that the terminating or coupling reaction can readily be applied to polymerizations employing the catalyst compositions of this invention in providing an increase in molecular weight of the polymeric products.

EXAMPLE VI

Another series of runs were performed employing a preformed initiator composition of this invention. This initiator was prepared by mixing 6.0 millimoles of n-butyllithium (0.20 M in cyclohexane) with 2.5 millimoles of diethylzinc (0.133 M in cyclohexane). This mixture was stored at room temperature. The recipe and results obtained in these runs are shown below.

Polymerization Recipe

| | Parts by weight |
|---|---|
| Butadiene | 75 |
| Styrene | 25 |
| Cyclohexane | 780 |
| Tetrahydrofuran (THF) | 1.5 |
| Divinylbenzene (DVB) | 0.105 |
| n-Butyllithium (n-BuLi) | 1.2 mhm |
| Diethylzinc (DEZ) | 0.5 mhm |
| Temperature, °F | 158 |
| Time, hours | 1 |
| Charge order: | cyclohexane, N$_2$ purge, butadiene, styrene, DVB, THF, preformed initiator, adjust temperature to 158°F. |

These runs were terminated and the products isolated as in Example I.

TABLE VI

| Run No. | Preform Time, days | Conversion % | Mooney Viscosity ML-4 (a) |
|---|---|---|---|
| 1 (b) | 0 | 100 | 25 |
| 2 | 1 | 100 | 30 |
| 3 | 2 | 100 | 26 |
| 4 | 3 | 100 | 30 |
| 5 | 6 | 100 | 40 |
| 6 (c) | 0 | 100 | 38 |

(a) ASTM D 1646-63.
(b) Preformed initiator, used immediately.
(c) Initiator components added separately.

The results above show the preformed initiator is still active after several days aging with essentially no change in efficiency.

EXAMPLE VII

Other runs were conducted in which other organometals were employed with n-butyllithium as initiator compositions of this invention. The recipe employed and results of these runs are shown below.

Polymerization Recipe

| | Parts by Weight |
|---|---|
| Butadiene | 75 |
| Styrene | 25 |
| Cyclohexane | 780 |
| Tetrahydrofuran (THF) | 1.5 |
| n-Butyllithium (n-BuLi) | 1.2 mhm |
| Organometal | variable |
| Divinylbenzene (DVB) | variable |
| Temperature, °F | 158 |
| Time, hours | 1 |
| Charge order: | cyclohexane, N$_2$ purge, THF, butadiene, styrene, DVB (where added), organometal (where added), temperature to 158°F. |

These runs were terminated and products isolated as described in Example I.

TABLE VII

Triisobutylaluminum (TBA)

| Run No. | Organometal mhm | DVB phm | Conversion % | I.V. |
|---|---|---|---|---|
| 1 | 0 | — | 100 | 1.47 |
| 2 | 0.2 | — | 100 | 0.94 |

Di-n-Amylmagnesium (a)

| | | | | |
|---|---|---|---|---|
| 3 | 0 | — | 97 | 1.54 |
| 4 | 0.2 | — | 96 | 1.08 |
| 5 | 0.25 | 0.10 | 100 | 1.53 |

Diethylcadmium

| | | | | |
|---|---|---|---|---|
| 6 | 0.5 | 0.10 | 100 | 1.36 |

(a) Unsolvated product prepared from 1-bromopentane and magnesium.

The results in Table VII show that organometals of metals of Groups 2a, 2b, and 3a form initiator compositions of this invention when mixed with an organolithium compound in the presence of a polar compound.

EXAMPLE VIII

Further runs were conducted in which diethylzinc was employed as the hydrocarbyl metal compound, n-butyllithium as the organolithium compound, and tetrahydrofuran as the polar compound. These particular runs were made to show results obtainable by varying the level of the polar compound utilized.

Polymerization Recipe

|  | Parts by weight |
| --- | --- |
| Butadiene | 100 |
| Cyclohexane | 780 |
| Tetrahydrofuran | variable |
| n-Butyllithium (BuLi) | 0.14 (2.2 mmoles) |
| Diethylzinc (DEZ) | 0.20 (1.8 mmoles) |
| Temperature, °F | 122 |
| Time, hours | 4 |
| Charge order: | (A) cyclohexane, THF, BuLi, DEZ, 20 minutes at room temperature, butadiene. |
|  | (B) cyclohexane, THF, BuLi, butadiene, 5 minutes at room temperature, DEZ. |

TABLE VIII

| Run No. | THF, Parts | Conversion, % (a) | Inherent Viscosity |
| --- | --- | --- | --- |
| 1 | 0 | 95 | 0.84 |
| 2 | 0.45 | 85 | 0.47 |
| 3 | 0.89 | 74 | 0.44 |
| 4 | 1.34 | 87 | 0.43 |
| 5 | 2.24 | 91 | 0.43 |
| 6 | 8.9 | 99 | 0.46 |
| 7 | 22.4 | 99 | 0.41 |
| 8 | 0 | 97 | 0.85 |
| 9 | 0.45 | 86 | 0.48 |
| 10 | 0.89 | 85 | 0.43 |
| 11 | 1.34 | 83 | 0.41 |
| 12 | 2.24 | 89 | 0.42 |
| 13 | 8.9 | 100 | 0.49 |
| 14 | 22.4 | 100 | 0.48 |

(a) Some loss during coagulation was noticed in a few of the runs. Conversion is believed to be quantitative in all cases.

Thus, as can be seen, the order of charging the components of the initiator composition is not critical, and the amount of polar compound can vary widely.

EXAMPLE IX

Subsequent coupling of the polymers, such as the polybutadiene, prepared by the use of the initiator compositions of the invention, i.e., the initiator composition formed by admixing an organolithium compound and a hydrocarbyl metal compound and employed in the presence of a polar compound, when coupled with known procedures with a coupling agent such as silicon tetrachloride resulted in a coupled polybutadiene with an almost perfectly symmetrical GPC curve and heterogeneity index of 2.

The polymeric products prepared with the initiator compositions of this invention can be vulcanized in commonly employed compounding recipes to provide tire tread stock, molded rubber articles, hose, belting, and the like. These products can contain carbon black and other reinforcing agents and extending materials such as the commonly employed extender oils. They can also be employed in admixture with other polymers, rubbery or plastic in nature.

In my description, including the examples, I have shown the beneficial results obtainable with the initiator compositions of the invention. Certainly, variations and modifications of both the initiator compositions and the process of using them in preparing polymeric products are possible, without straying from the intended scope and spirit of my disclosure including my claims appended.

I claim:

1. As an initiator composition effective for the polymerization of monomers polymerizable with organoalkali metal initiator systems, the admixture of:
   a. an organolithium compound $R(Li)_x$ wherein R is a hydrocarbon radical containing up to 20 carbon atoms and $x$ is an integer of one to four inclusive,
   b. a hydrocarbyl metal compound $R_nM$ wherein said M is a metal of group 2a, 2b, or 3a of the Periodic Table and is beryllium, calcium, strontium, barium, zinc, cadmium, mercury, boron, aluminum, gallium, indium, or thallium, and n is an integer equal to the valence of M, and
   c. a polar compound of up to 30 carbon atoms per molecule wherein said polar compound is hydrocarbyl ether, thioether, or tertiary amine, wherein the mole ratio of (a):(b) is about 0.1:1 to 10:1, and the ratio of (a):(c) is about $8.33 \times 10^{-3}$ to $10^4$ gram millimoles of organolithium compound per gram of polar compound.

2. The initiator composition according to claim 1 wherein the mole ratio of said (a):(b) is about 1:1 to 5:1.

3. The initiator composition according to claim 1 wherein said hydrocarbyl metal compound is a compound of said beryllium, calcium, strontium, or barium.

4. An initiator composition according to claim 1 wherein said hydrocarbyl metal compound is a compound of a metal of Group 2b.

5. The initiator composition according to claim 4 wherein said organolithium compound is butyllithium, said hydrocarbyl metal compound is diethylzinc or diethylcadmium, and said polar compound is tetrahydrofuran.

6. The initiator composition according to claim 4 wherein said organolithium compound is an insoluble dilithium initiator prepared by reacting lithium metal with isoprene in dimethyl ether and dispersing the resulting reaction product in an aromatic solvent; said hydrocarbyl metal compound is diethylzinc; and said polar compound is the aforesaid dimethyl ether.

7. The initiator composition according to claim 4 wherein said organolithium compound is the product prepared by reacting one mole of butadiene with two moles of sec-butyllithium in a cycloaliphatic solvent, said hydrocarbyl metal compound is diethylzinc, and said polar compound is tetrahydrofuran.

8. An initiator composition according to claim 1 wherein said hydrocarbyl metal compound is a compound of a metal of Group 3a.

9. The initiator composition according to claim 8 wherein said organolithium compound is n-butyllithium, said hydrocarbyl metal compound is triisobutylaluminum, and said polar compound is tetrahydrofuran.

10. As an initiator composition effective for the polymerization of monomers polymerizable with organoalkali metal initiator systems, the admixture of:

a. an organolithium compound R(Li)$_x$ wherein R is a hydrocarbon radical containing up to 20 carbon atoms and $x$ is an integer of one to four inclusive,
b. a hydrocarbyl metal compound R$_n$Mg wherein Mg is magnesium and n is an integer equal to the valence of magnesium, and
c. a hydrocarbyl ether or thioether polar compound of up to 30 carbon atoms per molecule,
wherein the mole ratio of (a):(b) is about 0.1:1 to 10:1, and the ratio of (a):(c) is about $8.33 \times 10^{-3}$ to $10^4$ gram millimoles of organolithium compound per gram of polar compound.

11. The initiator composition according to claim 10 wherein said organolithium compound is n-butyllithium, said hydrocarbyl metal compound is di-n-amylmagnesium, and said polar compound is tetrahydrofuran.

12. An initiator composition comprising n-butyllithium, di-n-amyl magnesium, and tetrahydrofuran, wherein the mole ratio of said n-butyllithium:di-n-amyl magnesium is in the range of about 0.1:1 to 10:1, and the ratio of gram millimoles of n-butyllithium per gram of tetrahydrofuran is in the range of about $8.33 \times 10^{-3}$ to $10^4$.

13. An initiator composition which comprises the admixture of:
a. an organolithium compound which can be represented by the general formula R(Li)$_x$ wherein R is a hydrocarbon radical containing up to 20 carbon atoms and $x$ is an integer of one to four inclusive,
b. a hydrocarbyl metal compound of a metal of Group 2b and which can be represented by the general formula R$_n$M wherein M is zinc, cadmium, or mercury, and
c. a polar compound wherein said polar compound is hydrocarbyl ether, thioether, or tertiary amine, containing up to 30 carbon atoms per molecule,
wherein the mole ratio of said (a) organolithium compound:(b) hydrocarbyl metal compound is in the range of about 0.1:1 1 to 10:1, and the ratio of (a):(c) is about $8.33 \times 10^{-3}$ to $10^4$ gram millimoles of organolithium compound per gram of polar compound.

14. An initiator composition which comprises the admixture of butyllithium, diethyl zinc or diethyl cadmium, and tetrahydrofuran, wherein the mole ratio of said butyllithium:diethyl zinc or diethyl cadmium is in the range of about 0.1:1 to 10:1, and the ratio of gram millimoles of n-butyllithium per gram of tetrahydrofuran is in the range of about $8.33 \times 10^{-3}$ to $10^4$.

15. An initiator composition comprising the admixture of:
a. an organolithium compound comprising an insoluble dilithium iniator prepared by reacting lithium metal with isoprene and dimethyl ether and dispersing the resulting reaction product in an aromatic solvent,
b. diethyl zinc, and
c. dimethyl ether,
wherein the mole ratio of said organolithium compound:diethyl zinc is in the range of about 0.1:1 to 10:1, and the ratio of gram millimoles of n-butyllithium per gram of dimethyl ether is in the range of about $8.33 \times 10^{-3}$ to $10^4$.

16. An initiator composition comprising the admixture of:
a. an organolithium compound prepared by reacting butadiene with sec-butyllithium in a cycloaliphatic solvent,
b. diethyl zinc, and
c. tetrahydrofuran,
wherein the mole ratio of said organolithium compound:diethyl zinc is in the ratio of about 0.1:1 to 10:1, and the ratio of gram millimoles of n-butyllithium per gram of tetrahydrofuran is in the range of about $8.33 \times 10^{-3}$ to $10^4$.

17. An initiator composition which comprises the admixture of:
a. an organolithium compound which can be represented by the general formula R(Li)$_x$ wherein R is a hydrocarbon radical containing up to 20 carbon atoms and $x$ is an integer of one to four inclusive,
b. a hydrocarbyl metal compound of a metal of Group 3a and which can be represented by the general formula R$_n$M wherein M is boron, aluminum, gallium, indium, or thallium, and
c. a polar compound wherein said polar compound is ether, thioether, or tertiary amine, containing up to 30 carbon atoms per molecule,
wherein the mole ratio of said (a) organolithium compound:(b) hydrocarbyl metal compound is in the range of about 0.1:1 to 10:1, and the ratio of (a):(c) is about $8.33 \times 10^{-3}$ to $10^4$ gram millimoles of organolithium compound per gram of polar compound.

18. An initiator composition comprising n-butyllithium, triisobutylaluminum, and tetrahydrofuran, and which employs a ratio of said n-butyllithium:triisobutylaluminum of about 0.1:1 to 10:1, and the ratio of gram millimoles of n-butyllithium per gram of tetrahydrofuran is in the range of about $8.33 \times 10^{-3}$ to $10^4$.

* * * * *